United States Patent

[11] 3,577,058

[72] Inventor Richard L. Cohen
    Old Bridge, N.J.
[21] Appl. No. 785,133
[22] Filed Dec. 19, 1968
[45] Patented May 4, 1971
[73] Assignee The Bendix Corporation

[54] SELF-SYNCHRONOUS MOTOR CONTROL INCLUDING AN AC TRANSMITTER, A DC RECEIVER, AND A UNIQUE AMPLIFIER-DEMODULATOR
5 Claims, 8 Drawing Figs.

[52] U.S. Cl. .................................................. 318/691, 318/684
[51] Int. Cl. ..................................................... G05b 11/12
[50] Field of Search .......................................... 318/560

[56] References Cited
UNITED STATES PATENTS

| | | | |
|---|---|---|---|
| 3,193,747 | 7/1965 | Kittrell | 318/(20.850X) |
| 3,452,260 | 6/1969 | Di Meo | 318/24 |
| 1,941,615 | 1/1934 | Mirick | 318/23.5X |
| 2,418,193 | 4/1947 | Peterson | 318/23 |
| 2,466,687 | 4/1949 | Craddock et al. | 318/23.5 |
| 2,496,105 | 1/1950 | Pearson | 318/23.5 |
| 2,669,678 | 2/1954 | Pfuntner | 318/23.5X |
| 2,935,660 | 5/1960 | Patchell | 318/20.835X |
| 3,327,185 | 6/1967 | Kawada | 318/23.5 |

Primary Examiner—T. E. Lynch
Attorney—Plante, Hartz, Smith & Thompson

ABSTRACT: An indicating system including AC synchro transmitters providing AC signals corresponding to a condition. The AC signals are demodulated by phase-sensitive demodulators and the rectified signals are applied to DC synchro receivers operating an indicator for indicating the condition.

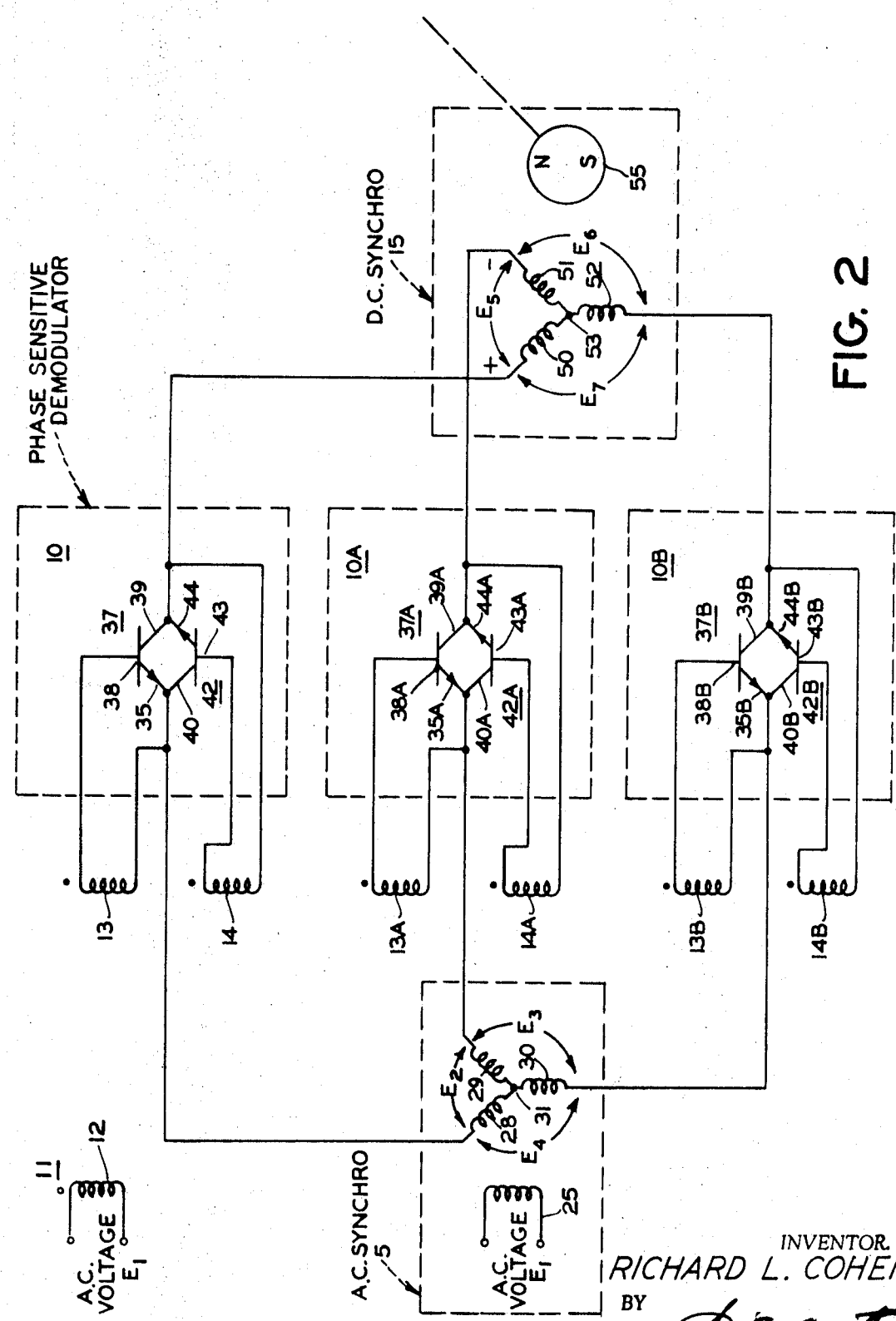

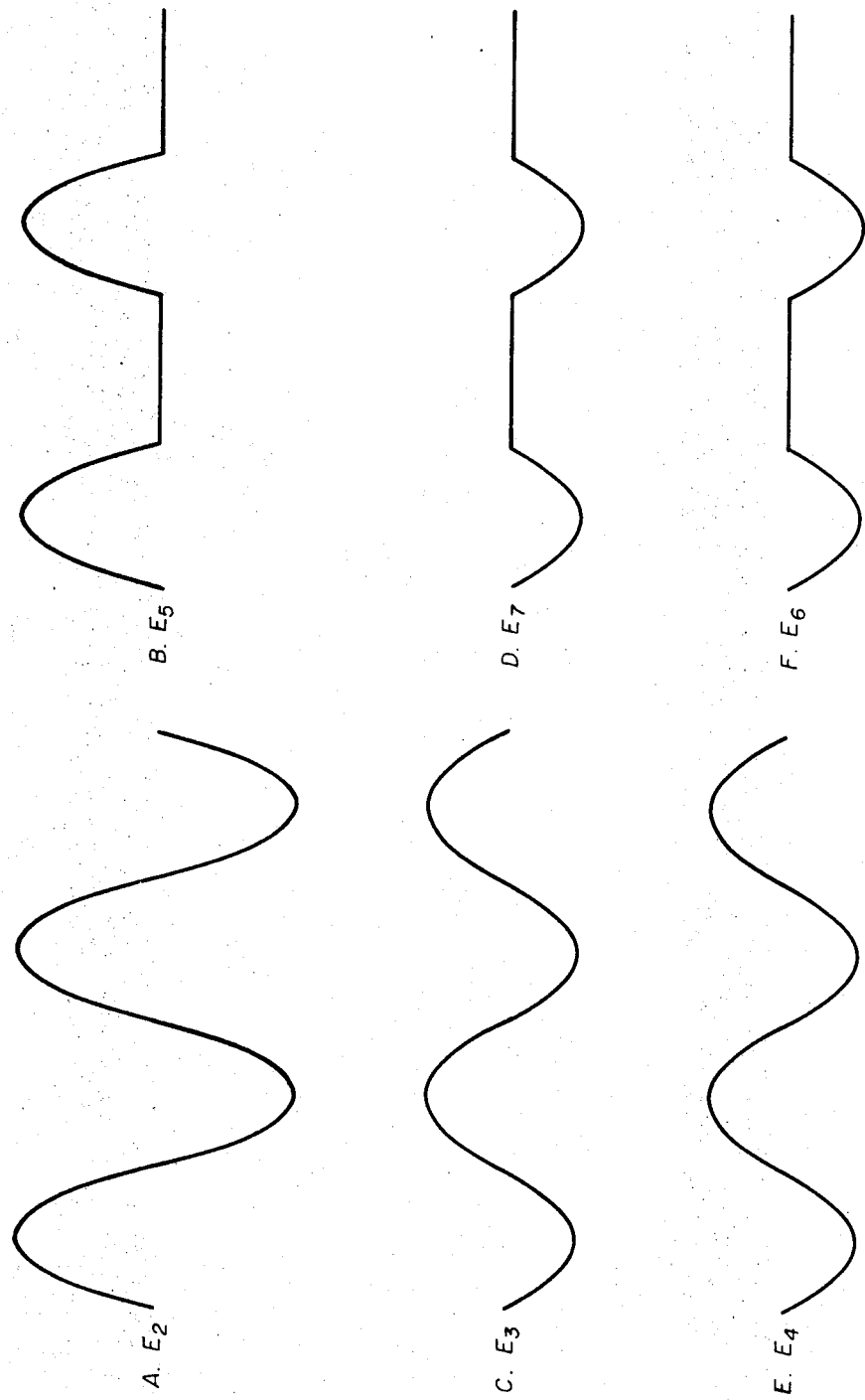

3,577,058

SELF-SYNCHRONOUS MOTOR CONTROL INCLUDING AN AC TRANSMITTER, A DC RECEIVER, AND A UNIQUE AMPLIFIER-DEMODULATOR

BACKGROUND OF THE INVENTION

1. Field of the Invention

This invention relates to synchro systems and, more particularly, to a synchro system used for indication purposes.

2. Description of the Prior Art

Synchro indicating systems as used heretofore included AC transmitters and receivers. The receivers had disadvantages with regard to weight, space, power and reliability. The receivers, because of their size, could not be mounted next to the counter wheels in digital indicators and gearing was required to drive the counter wheels. The gearing added to the size, weight and cost of the indicators, and the backlash of the gearing caused inaccuracies.

The present invention overcomes these disadvantages by using DC synchro receivers. The DC synchros are considerably smaller than AC synchros and can be directly connected to the counter wheels. The use of DC synchros decreases the cost, weight, space and power requirements while increasing the reliability and accuracy of the indicators.

The signals from the AC synchro transmitter cannot be rectified with an ordinary rectifier, such as a diode, because the signals are lost when they reverse phase. The present invention uses a phase-sensitive demodulator which demodulates the signals from the AC transmitter irrespective of phase reversal of the signals.

SUMMARY OF THE INVENTION

An indicating system having AC synchro transmitters providing AC signals corresponding to a condition. Phase sensitive demodulators demodulate the AC signals. Each demodulator includes a pair of transistors forward biased during half cycles of the AC signals to pass the signals irrespective of phase. The demodulated signals control DC synchro receivers operating an indicator for indicating the condition.

One object of the present invention is to use demodulated AC signals from an AC synchro transmitter to drive a DC synchro irrespective of the phase of the AC signals.

Another object of the invention is to provide an indicating system having less size and weight, better reliability, and requiring less power than indicating systems used heretofore.

Another object of the present invention is to eliminate gearing between the synchro receiver and indicator in a digital indicator thereby increasing the accuracy and reducing the cost of the indicator.

Another object of the invention is to provide a demodulator which is phase-sensitive in accordance with AC signals to demodulate the AC signals irrespective of their phase.

The foregoing and other objects and advantages of the invention will appear more fully hereinafter from a consideration of the detailed description which follows, taken together with the accompanying drawings wherein one embodiment of the invention is illustrated by way of example. It is to be expressly understood, however, that the drawings are for illustration purposes only and are not to be construed as defining the limits of the invention.

DESCRIPTION OF THE DRAWINGS

FIG. 2 is a schematic diagram for indicating one digit in the system shown in FIG. 1.

FIGS. 3A through 3F is a diagrammatic representation of the operating voltages of phase-sensitive demodulator shown in FIG. 2.

DESCRIPTION OF THE INVENTION

Figure 1:
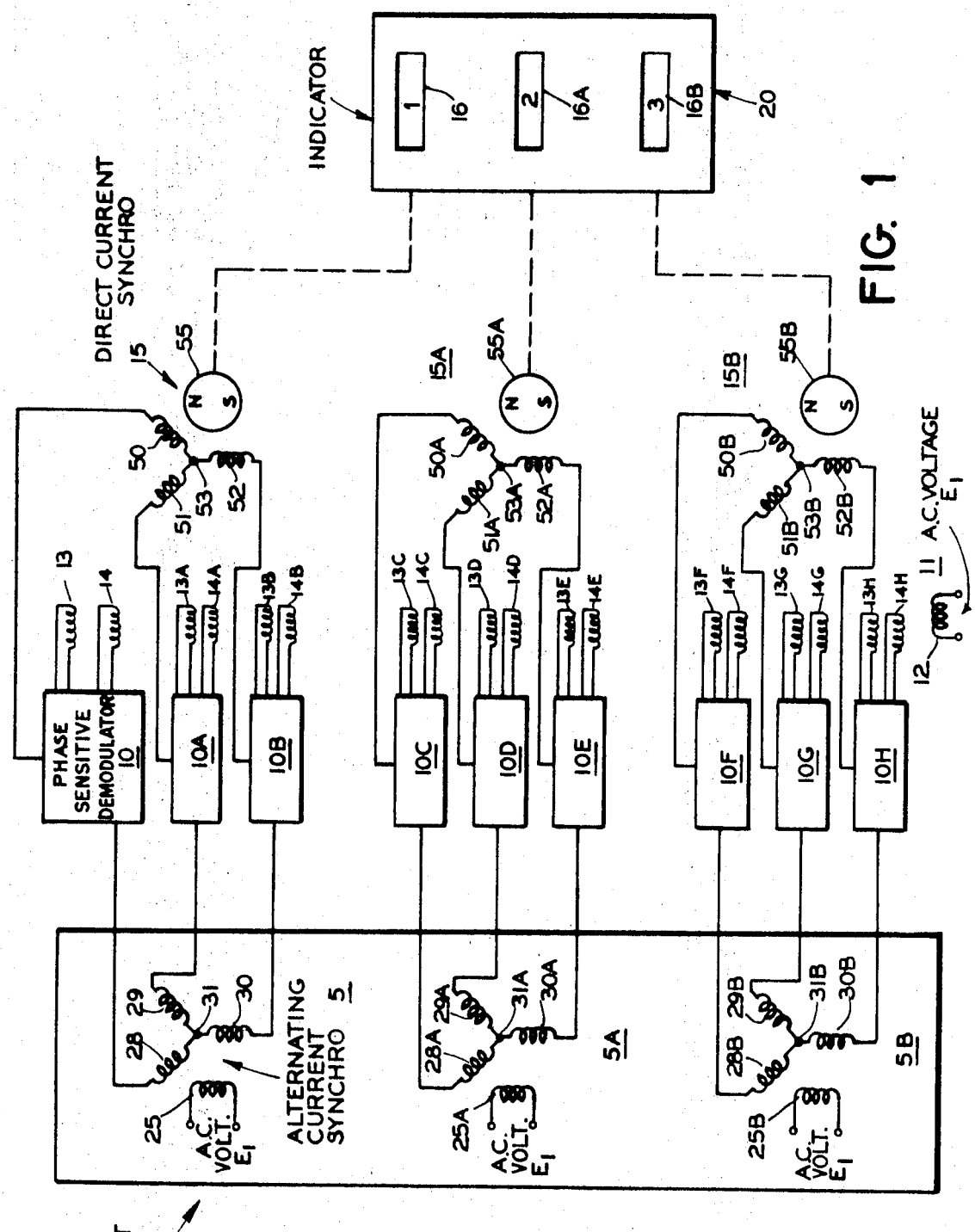
FIG. 1 is a block diagram of a novel indicating system constructed according to the invention for indicating a numeral with three digits.

Referring to FIG. 1 there is shown a novel indicating system including sensing equipment 1 having AC synchros 5, 5A and 5B providing AC signals corresponding to a condition. Synchro 5 has a rotor winding 25 positioned in accordance with the condition and energized by an AC voltage $E_1$ and stator windings 28, 29 and 30 having a common connection 31. Synchros 5A and 5B have similar rotor windings and stator windings with corresponding numbers having suffixes A and B. DC synchros 15, 15A and 15B operate an indicator 20 in response to the signals and indicate the condition with three numerals 16, 16A and 16B. DC synchro 15 has a permanent magnet rotor 55 and stator windings 50, 51 and 52 having a common connection 53. Synchros 15A and 15B have similar rotor and stator windings with corresponding numbers having suffixes A and B.

Phase-sensitive demodulators 10, 10A and 10B connect stator windings 28, 29 and 30 of AC synchro 5 to stator windings 50, 51 and 52, respectively, of DC synchro 15. Phase-sensitive demodulators 10C, 10D and 10E connect stator windings 28A, 29A and 30A of AC synchro 5A to stator windings 50A, 51A and 52A, respectively, of DC synchro 15A. Phase-sensitive demodulators 10F, 10G and 10H connect the stator windings 28B, 29B and 30B of AC synchro 5B to stator windings 50B, 51B and 52B, respectively, of DC synchro 15B. Phase-sensitive demodulators 10, 10A, 10B, 10C, 10D, 10E, 10F, 10G, and 10H demodulate the AC signals.

A transformer 11 has a primary winding 12, energized by AC voltage $E_1$, and secondary windings 13, 14, 13A, 14A, 13B, 14B, 13C, 14C, 13D, 14D, 13E, 14E, 13F, 14F, 13G, 14G, 13H and 14H providing AC voltages induced by AC voltage $E_1$. Secondary windings 13 and 14 are connected to phase-sensitive demodulator 10, as hereinafter explained, and the remaining secondary windings are similarly connected to phase-sensitive demodulators bearing the same suffixes. The transformer 11 is used for isolation purposes.

Referring to FIG. 2 there is shown a schematic diagram for indicating one digit 16. Synchro 5 is shown as having rotor winding 25 angularly positioned to correspond to the condition. Winding 25 is energized by AC voltage $E_1$. Synchro 5 also has stator windings 28, 29 and 30 providing AC signals $E_2$, $E_3$ and $E_4$ corresponding to the angular position of rotor winding 25.

Phase-sensitive demodulator 10 includes transistors 37 and 42 having emitters 35 and 44, bases 38 and 43, and collectors 39 and 40, respectively. Emitter 35 and collector 40 of transistors 37 and 42, respectively, are connected to stator winding 28 of synchro 5. Collector 39 and emitter 44 of transistors 37 and 42, respectively, are connected to stator winding 50 of synchro 15. Emitters 35 and 44 of transistors 37 and 42 are connected to ends of secondary windings 13 and 14, respectively, of transformer 11; while bases 38 and 43 are connected to the other ends of secondary windings 13 and 14, respectively, so that the induced AC voltage applied by secondary winding 13 across emitter 35 and base 38 of transistor 37 is in phase with the induced AC voltage applied by secondary winding 14 across emitter 44 and base 43 of transistor 42.

Phase-sensitive demodulators 10A and 10B are identical to phase-sensitive demodulator 10, and have similar elements with corresponding numerals bearing the suffixes A and B, respectively, and are connected in the same manner to secondary windings 13A, 14A, 13B and 14B of transformer 11. Phase-sensitive demodulators 10A and 10B connect stator windings 29 and 30 of synchro 5 to stator windings 51 and 52, respectively, of synchro 15.

Rotor 55 of synchro 15 will position itself according to a magnetic field established by current flowing through stator windings 50, 51 and 52. The rotor 55 of synchro 15 is mechanically connected to indicator 20, as indicated by the dash line in FIG. 1, for displaying one digit 16 of the three digit numeral.

OPERATION

Referring to FIG. 2, during half cycles of the AC voltage $E_1$, transistors 37 and 42 and 37A and 42A in phase-sensitive demodulators 10 and 10A, respectively, are forward biased by the induced AC voltages provided by secondary windings 13, 14, 13A, and 14A of transformer 11. When the AC signal $E_2$, shown in FIG. 3A, is in phase with the induced AC voltages, the voltage at emitter 35/collector 40 node in phase-sensitive demodulator 10 is more positive than the voltage at collector 39/emitter 44 node causing transistor 42 to conduct. The voltage at collector 39A/emitter 44A node in phase-sensitive demodulator 10A is more positive than the voltage at emitter 35A/collector 40A node causing transistor 37A to conduct. During the other half cycles of AC voltage $E_1$, all transistors are back biased by the induced AC voltages provided by secondary windings 13, 14, 13A and 14A of transformer 11 so that the transistors are nonconductive. The alternate conducting and nonconducting of transistors 42 and 37A demodulates AC signal $E_2$. Phase-sensitive demodulators 10 and 10A apply a demodulated signal $E_5$, show in FIG. 3B, across stator windings 50 and 51 of DC synchro 15 having the polarity indicated in FIG. 2.

When the AC signals $E_2$ is out of phase with the induced AC voltages provided by secondary windings 13, 14, 13A and 14A of transformer 11, half cycles of the induced AC voltages still forward bias transistors 37 and 42, and 37A and 42A in phase-sensitive demodulators 10 and 10A, respectively. The voltage at collector 39/emitter 44 node in phase-sensitive demodulator 10 is more positive than the voltage at emitter 35/collector 40 node so that transistor 37 conducts. The voltage at emitter 35A/collector 40A node in phase-sensitive demodulator 10A is more positive than the voltage at collector 39A/emitter 44A node so that transistor 42A conducts. During the other half cycles of the induced AC voltages provided by secondary windings 13, 14, 13A and 14A, all transistors are back biased so that the transistors are nonconductive. The alternate conducting and nonconducting of transistors 37 and 42A demodulates AC signal $E_2$. Demodulated signal $E_5$ has an opposite polarity to that shown in FIG. 2 when AC signal $E_2$ is out of phase with the induced AC voltages provided by secondary windings 13, 14, 13A and 14A of transformer 11.

AC signals $E_3$ and $E_4$ shown in FIGS. 3C and 3E, respectively, are demodulated in the same manner by phase-sensitive demodulators 10A and 10B, and 10 and 10B, respectively to provide signals $E_7$ and $E_6$, respectively, as shown in FIGS. 3D and 3F, respectively.

The demodulated signals $E_5$, $E_6$ and $E_7$ applied to stator windings 50, 51 and 52 of synchro 15 create a magnetic field causing rotor 55 to follow rotor winding 25 of synchro 5. Rotor 55 of synchro 15 operates one digit 16 of indicator 20.

Although a three-digit indicating system is shown, more digits can be displayed with corresponding increases in the number of AC synchros, DC synchros, and phase-sensitive demodulators.

Although but a single embodiment of the invention has been illustrated and described in detail, it is to be expressly understood that the invention is not limited thereto. Various changes may also be made in the design and arrangement of the parts without departing from the spirit and scope of the invention as the same will now be understood by those skilled in the art.

I claim:

1. A synchro system comprising an AC synchro providing AC signals corresponding to a condition, a DC synchro connected back to back by at least three connections to the AC synchro, and phase-sensitive demodulating means in each of the connections for demodulating the AC signals and each phase-sensitive demodulating means includes a pair of transistors of the same type, each having an emitter, a collector and a base, the emitter and the collector of one transistor being connected to the collector and the emitter, respectively, of the other transistor, one emitter-collector connection is connected to the AC current synchro and the other emitter-collector connection is connected to one input to the DC synchro, and the bases and emitters of both transistors are connected so that both transistors are biased by AC voltages phase related to the AC signals causing one transistor to pass an AC signal during half cycles of an AC voltage and to block the AC signal during the other half cycles so as to demodulate the AC signal.

2. A synchro system as described in claim 1 in which the stator windings of the AC synchro are connected in a Y-configuration, and the stator windings of the DC synchro are connected in a Y-configuration.

3. A synchro system as described in claim 1 further comprising means connected to the DC synchro for indicating the condition in accordance with the output from the DC synchro.

4. A synchro system as described in claim 1 in which the phase-related AC voltages are provided by a transformer having a primary winding energized by an AC voltage phase related to the AC signals, and having secondary windings connected to the switching means.

5. A phase-sensitive demodulator adapted to receive AC signals comprising a pair of transistors of the same type, each having an emitter, a base and a collector; and the emitter and the collector of one transistor are connected to the collector and the emitter, respectively, of the other transistor, with one emitter-collector connection receiving the AC signal and the emitters and bases of the transistors are connected so that both transistors are biased by AC voltages phase related to the AC signals causing one transistor to pass the AC signal to the other emitter-collector connection during half cycles of an AC voltage and to block the AC signal during the other half cycles.